United States Patent Office 3,528,522
Patented Sept. 15, 1970

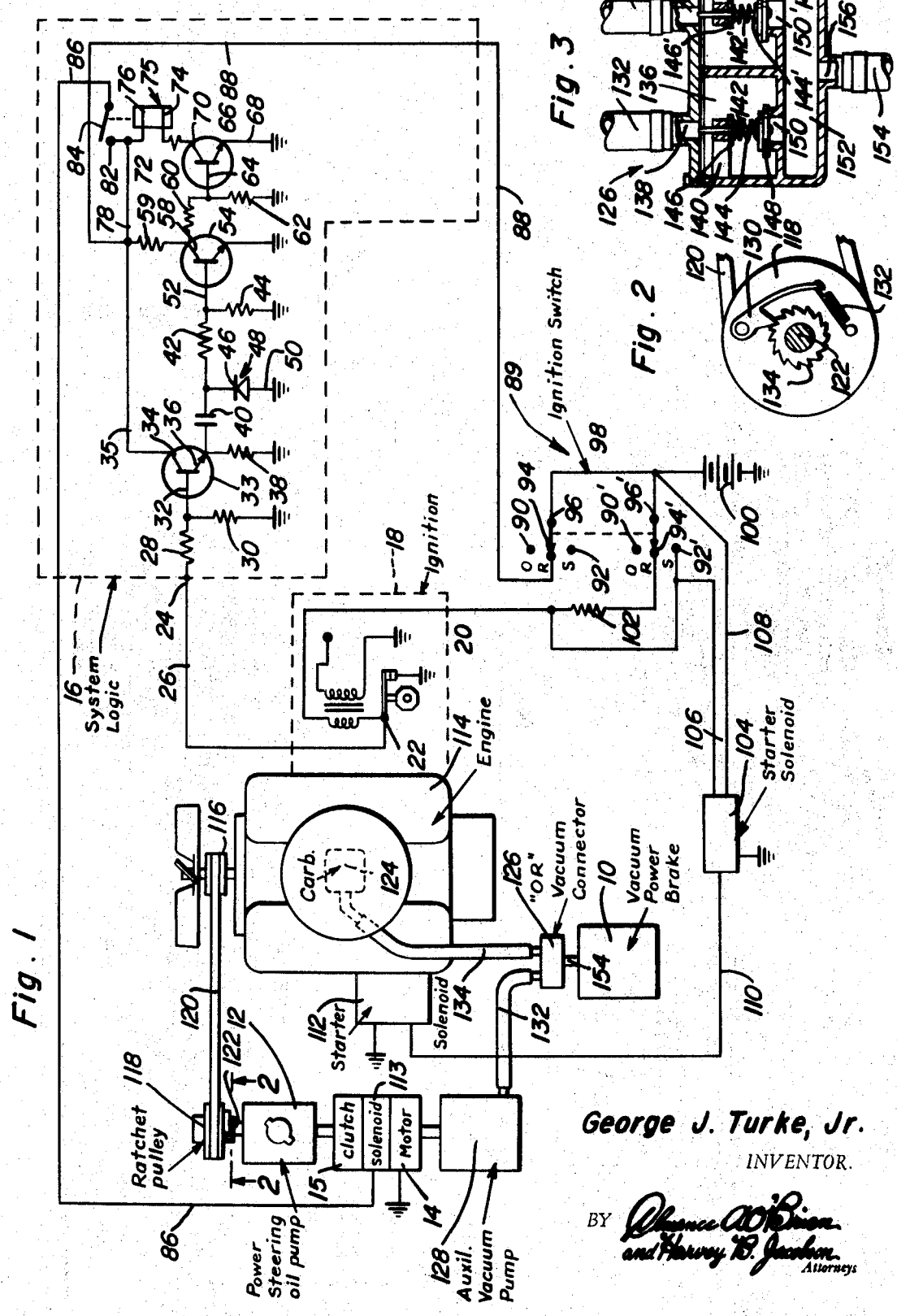

3,528,522
FULL TIME VEHICLE POWER ASSIST CONTROL SYSTEM
George J. Turke, Jr., 12000 Moss Ranch Road, Miami, Fla. 33156
Filed Sept. 3, 1968, Ser. No. 757,064
Int. Cl. B60r 21/00
U.S. Cl. 180—103                  11 Claims

ABSTRACT OF THE DISCLOSURE

An electronic logic system connected to the electrical ignition network of a vehicle senses engine stall to operate a standby motor driving an oil pump and a vacuum pump for power assist operation of steering and brake mechanisms. During normal engine operation, the logic system is inactive and doesn't interfere with engine operation of the oil pump for power steering and engine manifold operation of the vacuum power operated brake mechanism.

---

The present invention relates to electromechanical control systems and more particularly to an electronic logic system for sensing engine condition to control delivery of auxiliary power for emergency use.

With the advent of power steering and power braking mechanisms, the ease of physical effort required by a motorist in controlling these mechanisms is greatly reduced when compared to conventional unassisted mechanical mechanisms. In power braking, of the vacuum assist type, depression of a brake pedal accomplishes a series of events beginning with the compression of a brake master cylinder which opens a passage communicating with the carburetor and enables carburetor vacuum to act in parallel with the master cylinder thereby facilitating the displacement thereof. However, as will be appreciated, for operation of power braking, carburetor vacuum must be maintained which requires the vehicle engine to be running. When the engine stalls, the vacuum action ceases with a sudden increase in the amount of mechanical pressure on the brake pedal required of the motorist to effect braking, which is several orders of magnitude greater than if power braking were assisting. This pressure is estimated to be at least 10–20 times greater than that required with the assistance of power brakes. Further, the change in operational pressure in an emergency failure or stall of the engine can be extremely dangerous due to the inability of the motorist to rapidly accommodate himself to the change and bring his vehicle to a rapid stop.

The foregoing dilemma is equally applicable to power steering. The power steering mechanism assists the turning of a vehicle's front wheels by means of hydraulic pressure. This pressure is derived from an oil pump that is driven by the engine. Thus, failure of engine operation places an extreme mental and physical burden on the motorist during manipulation of the steering wheel which may result in his physical disability to control the vehicle thereby endangering life. Further, the motorist's efficiency is decreased due to the mental necessity of human cogitation that could cloud cerebration and reflex response due to the dysrhythmic effect of human emotions on the nervous system.

Several prior art devices have been developed in order to assist a motorist in maintaining the power equipment of a motor vehicle fully operative during emergency situations. One such device includes a control circuit for operating a power steering unit through an auxiliary pump and an auxiliary oil reservoir system upon failure of the primary hydraulic system. Such failure is sensed by a pressure sensor that depends upon mechanical devices including valves which are subject to failure due to dirt and metal debris clogging and wearing the same; and springs which are prone to failure due to metal fatigue. Further, a mechanical pressure sensing system utilizing hydraulic fluid for sensing pressure is subject to leaks which render it inoperative at a time of critical need. Other prior art devices effect emergency power braking control from a pressure filled container which is normally sealed by a mechanical pressure sensitive valve. This type of construction will fail if a slow leak in the container causes a reduction of pressure therein to a value insufficient to operate the power equipment at a time when it is needed. Also, a mechanical pressure sensitive valve is prone to sticking which would cause failure of the device. A still further disadvantage of a pressurized container resides in the fact that operation of the power equipment can only be maintained for a limited time without recharge.

The present invention includes an electronic logic system for sensing engine failure in order to reliably effect electrical energization of an auxiliary motor which takes over drive of the power steering oil pump and drives an auxiliary vacuum pump for operation of the power brake mechanism of a vehicle. Engine stall is sensed through the ignition system by the logic to avoid unreliable mechanical and fluid pressure sensors which require costly installation and maintenance.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a diagrammatic representation of the present invention as connected to a conventional internal combustion engine.

FIG. 2 is a sectional view taken along a plane passing through section line 2—2 of FIG. 1.

FIG. 3 is a sectional view of a vacuum connector which is connected to the inlet of a vacuum power brake assembly.

Referring specifically to the drawing, and particularly FIG. 1, the present control system is shown in association with a conventional vacuum assist power brake assembly, diagrammatically denoted by 10. In addition, the present system is associated with a power steering oil pump 12. Motive power for continuing the operation of this power equipment is supplied by a motor diagrammatically denoted by 14 which is energized under control of a logic system 16 connected to the electrical input of motor 14. The motor remains inoperative during periods of normal engine operation. However, when engine stall occurs, the logic system 16 senses this emergency condition and energizes the motor 14. Unlike many prior art devices which sense pressure, the present invention determines a stall condition by sensing electrical inoperativeness of an ignition circuit 18, which by way of example has been illustrated as including a conventional point assembly 20. The "hot" or ungrounded point contact 22 is connected to the input 24 of logic system 16 through a connecting lead 26.

In brief, logic system 16 includes several stages of electronic switching utilizing transistors. By way of example, the present invention utilizes NPN transistors in all switching stages, each having a negative ground. The first one (transistor 33) being a common collector due to the fact that resistor 38 prevents an emitter to ground circuit and lead 35 is connected from the collector to the positive pole of the battery. A good battery is AC grounded due to its inherent low internal impedance. This makes lead 35 effectively grounded and makes transistor 33 a common (grounded) collector configuration. Transistors 54 and 66 have a common emitter configuration. In operation of each switching stage, the associated transistor passes through three regions of operation, namely, the cut-off; active; and saturation regions. Normal quiescent conditions for a transistor switch in this region require that both emitter-base junction and collector-base junction be reverse biased. This state is characterized by transistor base current approaching zero which commensurately results in near zero collector to emitter current. Accordingly, collector potential approaches the value of a connected collector biasing battery. In this regard, the transistor may be likened to a shunt switch appearing between collector and emitter terminals, the switch being open-circuited during the cut-off condition. During a switching operation, the transistor passes through a transient region referred to as the active region, in which the transistor performs a momentary linear amplification function. For purposes of switch design, rapid excursion through this active region is desired. In the saturation region, an increase in base-emitter current does not result in an appreciable increase in collector current. The collector current in fact approaches its limited value determined by the collector bias battery voltage divided by the value of collector load resistance. In this state, both the emitter-base and collector-base junctions are forward biased. This state may be likened to the equivalent existence of a shorted shunt switch connected across the collector-emitter transistor terminals thereby clamping the collector to the emitter terminal which is grounded (negative) in transistors 54 and 66 but passes current to the capacitor 40 from transistor 33 due to current limiting resistor 38.

As will be appreciated from studying FIG. 1, the logic system is connected by conductor 88 only to the "engine running" contact 94 of a vehicle ignition switch 89 so that the present invention remains inoperative during off and start ignition switch positions denoted by contacts 90 and 92. The system is put on stand-by alert when the ignition switch is positioned in the normal "engine running" position which results in normal pulse generation by ignition 18 providing positive going pulses at the input 24 of logic system 16. It is to be emphasized that although the present invention is explained in terms of a breaker ignition system, any breakerless point system that applies a pulse wave train will serve as a signal generating means. A positive signal is required by the presently described system. However, negative signals will merely require substitution of PNP transistors operating with reverse polarity bias voltages.

For simplifying the analysis of the logic system, the operation thereof will be described first in terms of normal engine running operation and then for an engine stalled condition. During normal engine operation, the ignition generates a positive pulse train which is applied between input terminal 24 and ground through current limiting (high resistance) resistors 28 and 30. The junction point between these resistors serves as a voltage divider output terminal for connection to base 32 of NPN transistor 33. The collector 34 of the transistor is connected to the positive potential terminal of a vehicle battery via lead 35. The emitter 36 of the transistor is connected to ground through output resistor 38. Upon application of a positive input pulse, the transistor collector junction is reverse biased and the emitter junction is forward biased so that transistor current gain is achieved during transistor conduction. During conduction (saturation state) of transistor 33 only a small current flows from the emitter to ground due to the high resistance of resistor 38. The majority of emitter current from transistor 33 flows to capacitor 40. This current flow (collector to emitter to capacitor) generates an output voltage in phase with the input voltage.

The transistor emitter 36 serves as an input terminal for a pulse shaping RC network comprising a serial path to ground through a D.C. blocking (A.C. coupling) capacitor 40 and directly connected resistors 42 and 44. The junction between the resistors provides a voltage output terminal. In order to limit the RC network input to positive voltages, a rectifying diode 48 has its cathode 46 connected between the junction of capacitor 40 and resistor 42, the diode anode 50 being connected to ground. Capacitor 40 passes only pulsating components of the transistor output. Emitter 36 to voltage output terminal 52 is an integrating RC network due to the large time constant of capacitor 40 which never allows it to become fully charged. Also, transitor 54 is deliberately chosen with a slow switching time (and a large internal capacitance) to prevent unsaturation and differentiation. However, an optional capacitor (with large time constant) can be put between output voltage terminal 52 and transistor 54 to further integrate and prevent differentiation. In either case a slow switching time of transistor 54 is essential to prevent unsaturation between pulses of current. Thus, the capacitor 40 and diode 50 from the voltage pulse output occurring across resistors 42 and 44 which will be diminished in amplitude when extracted across resistor 44 only.

The output appearing across resistor 44 is applied to the base 52 of a first transistor switching stage including an NPN transistor 54 arranged in a common emitter configuration. The emitter 56 of this stage is grounded and the transistor collector 58 is connected to the positive potential of the vehicle battery through a current limiting resistor 59. A second parallel path is connected between the collector and ground, and consists of current limiting resistors 60 and 62. The junction between these latter mentioned resistors provides an output terminal for the switching transistor. Under normal engine operating conditions, the transistor base receives positive going pulses from the prior integrator network thereby causing saturation of transistor 58 which in turn effectively short circuits the collector-emitter terminals of the transistor, thereby clamping the transistor collector to ground. Accordingly, the output junction point between resistors 60 and 62 is also grounded and no current appears at base of transistor 66 from this output junction point.

The junction point is connected to the base 64 of NPN transistor 66 being arranged in a common emitter configuration, the emitter 68 thereof being connected to ground. This transistor acts as a second switching stage including a current limiting resistor 72 connected directly to collector 70 of the transistor. The output terminal of resistor 62 is connected to a first terminal 74 of a relay armature 75. The opposite terminal of the armature denoted by 76 is connected to the positive potential terminal of the vehicle battery through connecting leads 78, 88 and ignition switch 89. The relay armature 75 is operatively associated with a single pole-single throw switch including a stationary contact 82 connected to the output terminal 76 of the armature. A switch arm 84 is associated with contact 82 and is connected to D.C. motor 14 through connecting lead 86.

In considering the operation of this last transistor switch stage, the transistor input or base 64 is effectively grounded due to the saturation of the previous switching stage so that no base-emitter current flows causing reverse biasing of both collector-base and emitter-base junctions (cutoff condition) of transistor 66. In such a state, collector current approaches zero and since the relay armature 75 is serially connected to the collector, the relay remains deenergized thereby preventing conduction of current through the relay switch to D.C. motor 14. Accordingly, during normal engine operation, D.C. motor 14 remains inoperative and the power equipment of the vehicle relies upon motive power from the engine in a conventional manner.

Should the engine stop running during operation of the vehicle (stall condition), the logic system 16 senses the condition and actuates the D.C. motor 14. The stall condition and cessation of ignition operation is accompanied by the establishment of a constant D.C. level at 22. The amplitude of this constant output depends upon the relationship between the points of the distributor. As will be appreciated, in conventional systems, this voltage will be positive if the points remain opened during stall but will be grounded should the points remain closed during stall. The level is of no import. Rather, the system becomes activated by a lack of ignition pulses. It is again emphasized that a breaker-point system is described for illustrative purposes and a breakerless system generating the same types of output voltages will cooperate with the present logic system in an identically satisfactory manner.

Considering the stall condition, the aforementioned constant voltage is applied to the input 24 of the logic system 16. Failure of a pulsating input to appear at the base of transistor 33 causes the production of a steady D.C. output rather than a chopped D.C. (or an A.C.) output across resistor 38 to capacitor 40 whose D.C. blocking action passes only pulsating (A.C.) inputs. Thus, the RC network and diode integrate no output causing the output terminal thereof to be effectively grounded (zero current flow). Therefore, the previously saturated switching transistor 54 is converted to cut-off operation by virtue of no base-emitter current flow causing reverse biasing of the emitter-base junction which then unsaturates the collector-emitter flow causing reverse biasing of the collector-base junction. Failure to drive the first transistor stage with a pulsating input results in the operation of transistor 33 in a quiescent condition which in turn results in the generation of a constant or D.C. output across the transistor output resistor 38. With such a D.C. input, the RC network generates no output so that the output terminal thereof is effectively grounded. Therefore, the previously saturated switching transistor 54 is converted to cut-off operation by virtue of the reverse biasing of the collector-base and emitter-base junctions thereof. The collector potential of this transistor will approach the positive battery potential as explained hereinbefore. This action in turn causes the generation of a positive voltage across output resistor 62 associated with transistor 54 due to division of collector voltage by the voltage divider including resistors 60 and 62.

Because base 64 of the succeeding switching transistor 66 is connected across resistor 62, this previously cut-off transistor is transformed to a saturation state wherein the transistor is transformed to a saturation state causing collector to emitter current to flow (both emitter-base and collector-base junctions become forward biased). The collector is effectively grounded thereby causing the flow of saturation current to the collector and through the serial path including relay armature 75, the saturation current being supplied from the vehicle battery which is connected via the ignition switch and leads 88 and 78 to the output terminal 76 of the armature. This flow of current through the armature causes energization thereof and commensurate closing of switching arm 84 associated with the armature. This action causes connection of switch arm 84 to the positive battery potential terminal through the serial path including stationary contact 82 and connecting leads 78 and 88. Since the switch arm 84 is connected to lead 86 which in turn is connected at the opposite end thereof to D.C. motor 14, the positive battery potential appears at the input of the motor thereby causing the energization thereof. The mechanical interconnection between this motor and the vehicle power equipment is explained hereinafter.

Operation of the logic system depends upon application of the positive battery potential thereto through an ignition switch 89. This switch is characterized as a dual gang switch, each section thereof being characterized as a single pole-double throw switch. Each section includes three stationary contacts, the first section having an off contact 90; a starting contact 92; and an "engine running" contact 94. A second identical stationary contact arrangement is associated with the second section and the numbering of these contacts corresponds to the numbering of the first section but specifically denoted in FIG. 1 by primed numbers. The first and second switch sections include selector arms 94 and 94' associated with terminals 96 and 96' respectively. These latter mentioned terminals are connected by means of a jumper or shorting lead 98 which in turn is connected to the positive potential terminal of vehicle battery 100. The negative potential terminal of the battery is grounded. As will be appreciated from studying FIG. 1, the first section of ignition switch 89 is employed to provide D.C. power to logic system 16 and the second switch section functions as a conventional ignition switch. Thus, "engine running" contact 94' is connected to the input of ignition 18 through a conventional ballast resistor 102, and starting contact 92' is connected directly to the ignition input. In a further conventional manner, the engine start contact 92' of the second switch section is connected to the low current input of a starter solenoid 104 through connecting lead 106. The high current solenoid input is connected to the positive battery potential terminal through lead 108. To complete the conventional starter circuit connections, the solenoid output is connected to a starter motor 112 through connecting lead 110 for causing engine 114 to "turn over."

During normal engine operation, the logic system 16 remains in a stand-by condition as hereinbefore explained, and motive power is supplied to the vehicle power equipment by means of rotating crankshaft pulley wheel 116. A second ratchet pulley wheel 118, having a structure explained in detail hereinafter is in coplanar alignment with the first pulley wheel, drivingly connected thereto by a belt 120. The latter mentioned ratchet pulley wheel 118 is mounted upon a shaft 122 which provides input power to the power steering oil pump 12 which in turn operates the vehicle's power steering.

FIG. 1 diagrammatically illustrates a vacuum power brake assembly 10 of the vacuum assist type. Such a conventional system requires the connection of the assembly input to the engine carburetor 124 in order to convey vacuum pressure to the vacuum power brake assembly. The present invention includes an "OR" vacuum connector 126 connected between the vacuum power brake assembly 10 and the carburetor 124 so that the power brakes operate in a normal manner when the engine is normally running. The specific structure of the "OR" connector is explained hereinafter.

In order to avoid putting too severe a requirement on the current handling capabilities of the contacts of the first section of the ignition switch and the relay contacts, when the D.C. motor 14 is started upon engine stall, the output from the relay could energize an optional starter-type solenoid 113 in a manner similar to starter circuit operation, when the ignition switch is turned to the start position, as hereinbefore described. Such a starter solenoid operatively associated with the D.C. motor 14 would in turn energize the motor. The motor 14 further includes an electrically operated clutch assembly 15. During normal engine operation, it is senseless and power-consuming to have the load of motor 14 upon the vehicle engine. Therefore, the clutch normally disconnects the motor from the oil pump 12 under normal engine running conditions. The clutch engages the D.C. motor 14 when the logic system senses an engine stall condition to effect energization of D.C. motor 14 to drive the power steering oil pump 12.

As will be appreciated, it is necessary to disengage pulley wheel 118 from its associated shaft 122 when driven by motor 14 in order to eliminate the load of the engine crankshaft. Ratchet pulley 118 accomplishes this as will be appreciated by viewing FIG. 2. Pulley wheel 118 mounts a pivotable pawl member 130 which is biased by spring member 132 into engagement with a ratchet wheel 134 secured to shaft 122. During drive of the pulley wheel 118 clockwise, by the belt 120, as viewed in FIG. 2, shaft 122 is driven clockwise due to the engagement of the pawl and ratchet. However, upon operation of D.C. motor 14, causing rotation of shaft 122 and ratchet wheel 134 in the same clockwise sense, the pawl overruns the teeth of ratchet wheel 134 thereby essentially causing disengagement between the shaft 122 and ratchet wheel 118.

The D.C. motor shaft extends rearwardly to drive an auxiliary vacuum pump 128 to provide emergency vacuum pressure generation conveyed to the vacuum power brake assembly 10 through connecting hose 132 and the "OR" connector 126. Thus, it will be understood that the power brakes continue their operation by receipt of vacuum pressures from either the carburetor or auxiliary vacuum pump. The selection of the source of vacuum pressure is accomplished by the "OR" connector clearly shown in FIG. 3. The connector includes two input lines 132 and 134 connected from the auxiliary vacuum pump 128 and carburetor 124, respectively. One output line 154 connects the vacuum connector and the power brake mechanism. Thus, vacuum pressure is transferred to the connector output when a vacuum exists at either input, and may therefore be considered a mechanical analogue of a logic "OR" gate. The actual mechanism for effecting connector operation includes a housing 135 having two adjacent and equally dimensioned chambers 136 and 136'. The chamber 136 communicates with hose 132 through an inlet port 138. Likewise, chamber 136' communicates with hose 134 through inlet port 138'. In order to simplify the analysis of the connector shown in FIG. 3, the mechanism contained in chamber 136 only will be described, but it will be appreciated that an identical mechanism is contained in chamber 136', the component parts for the second chamber 136' corresponding with those of the first chamber and differentiated by primed numbers. A bracket 140 extends into the chamber from a chamber wall to which the bracket is attached. The end portion of the bracket includes a bore in coaxial alignment with the inlet port 138. A rod 142 extends through said bore for termination at the opposite end thereof in a cylindrical sealing cap or member 148. A compression spring 144 is concentrically disposed along and intermediate the length of rod 142 and is outwardly retained by a washer 146 adjacent the underside of bracket 140 and the upper surface of the sealing cap 148. An outlet port 150 is disposed in underlying relation with the sealing member 148 and is normally retained in sealing relation therewith. The outlet port communicates with a generally elongated rectangular chamber 152 through the top wall of chamber 152. When considering both chambers 136 and 136', it will be noted that chamber 152 communicates with both ports 150 and 150'. The bottom wall of chamber 152 includes an outlet port 156 and mounts an outlet hose 154 which in turn is connected to the power brake mechanism. In operation of connector 126, should vacuum pressure exist at either inlet port 138 or 138', the associated sealing cap or member 148 is caused to be displaced from its sealing relationship with outlet port 150 due to the pressure differential across the sealing cap. Upon the opening of a cap, vacuum pressure develops within chamber 152 and commensurately in brake connecting hose 154. Displacement of one sealing member and the resultant vacuum in chamber 152 causes the other sealing cap to seal harder due to a pressure differential across the second cap opposite that of the first. Thus, the "OR" vacuum connector 126 performs excellent vacuum selection between two sources of vacuum pressure.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a vehicle having a source of electrical energy, an ignition controlled engine connected to said source and power means maintained in an operative condition during operation of the engine to assist operation of control devices, the combination comprising ignition sensing means for detecting engine stall, stand-by motor means energized by said source in response to said detection of engine stall by the sensing means, means for connecting said motor means to the power means for maintaining the same in said operative condition during engine stall, and means connected to the sensing means for de-energizing said motor means upon restoration of engine operation.

2. The combination of claim 1 wherein the power means include a power steering oil pump, and the control devices include a power steering mechanism operatively associated with the oil pump.

3. The structure set forth in claim 2 wherein the oil pump has a mechanical input, and further wherein the means connecting said motor and the oil pump includes a motor output shaft, and clutch means for engaging said motor output shaft and said pump input upon energization of said stand-by motor means.

4. The structure set forth in claim 1 in combination with engaging means interposed between said source and said motor means for rendering said motor means operative in response to detection of stall by said sensing means.

5. In a vehicle having a carburetor, the combination of claim 1 including an auxiliary vacuum pump driven by said stand-by motor means, an "OR" vacuum connector, means connecting said pump to said connector, means connecting said carburetor to said connector, said power means being a vacuum power brake system, means connecting said connector to said brake system, said "OR" connector maintaining said brake system in an operative condition by normally supplying said brake system with vacuum pressure from said carburetor, and supplying vacuum pressure from said vacuum pump during engine stall.

6. The structure set forth in claim 1 wherein said ignition sensing means comprises a gated switching circuit, said circuit including a plurality of cascaded stages comprising a first stage for amplifying input pulses, a second stage for wave shaping output pulses of said first stage, a third composite stage including switch means operating in a cut-off state in response to a pulse train output from said second stage, and further switch means driven by said third composite stage and connected between said source of electrical energy and said motor means retained in a de-energized condition during the cut-off state of said third composite stage, said first and second stages being rendered inoperative in response to a D.C. input, said inoperativeness causing transformation of said third composite stage to a conducting state, said further switch means enabling energization of said motor means from said source in response to conduction by said third composite stage.

7. The circuit set forth in claim 6 wherein said third composite stage includes a first switching transistor normally operating in a saturated condition, and a second switching transistor driven by said first switching transistor said second switching transistor normally operating in a cut-off condition, engine stall causing a reversal of operating conditions of said transistors.

8. The circuit set forth in claim 7 including a rectifying diode connected to the output of said first stage for limiting the second stage input to unipolar signals.

9. In combination with a vehicle ignition system producing a D.C. output of substantially constant amplitude under stall conditions and a pulsating output under normal conditions, and a load, a circuit for energizing said load under said stall conditions comprising detecting means connected to the ignition system for sensing said pulsating output, means connecting the load to the ignition system for energization of the load while the ignition system is producing said D.C. ouput, and switch means connected to the detecting means for preventing energization of the load in response to said sensing of the pulsating output of the ignition system.

10. The circuitry set forth in claim 9 wherein said detecting means comprises a gated switching circuit connected to said ignition system, said circuit including a plurality of cascaded stages comprising a first stage for amplifying pulses generated by said ignition system, rectifier diode means connected to the output of said first stage for limiting the output thereof to a unipolar signal, a second stage for wave shaping the output pulses of said first stage, and a third composite stage including switch means operating in a cut-off state in response to a pulse train output from said second stage.

11. The circuitry set forth in claim 10 wherein said third composite stage includes a first switching transistor normally operating in a saturated condition, and a second switching transistor driven by said first switching transistor, said second switching transistor normally operating in a cut-off condition, engine stall causing a reversal of operating conditions of said transistors.

References Cited
UNITED STATES PATENTS

| | | | |
|---|---|---|---|
| 2,228,032 | 1/1941 | MacGregor et al. | 340—263 |
| 3,182,648 | 5/1965 | Schneider et al. | |
| 3,191,050 | 6/1965 | Park | 290—30 X |
| 3,275,836 | 9/1966 | Vancha | 290—38 |
| 3,280,557 | 10/1966 | Sattavara | 180—79.2 |
| 3,387,598 | 6/1968 | Almenfors et al. | 123—179 |
| 3,414,734 | 12/1968 | Konrad | 180—1 |
| 3,434,282 | 3/1969 | Shelhart | 180—79.2 X |

KENNETH H. BETTS, Primary Examiner

U.S. Cl. X.R.

60—6, 52; 290—38